(12) United States Patent
Lee et al.

(10) Patent No.: US 9,074,649 B2
(45) Date of Patent: Jul. 7, 2015

(54) COMBINING STRUCTURE OF SHOCK ABSORBER

(71) Applicant: Mando Corporation, Gyeonggi-do (KR)

(72) Inventors: Jin Kee Lee, Jeonbuk (KR); Jun Sik Shin, Jeonbuk (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 14 days.

(21) Appl. No.: 13/739,558

(22) Filed: Jan. 11, 2013

(65) Prior Publication Data

US 2013/0180814 A1    Jul. 18, 2013

(30) Foreign Application Priority Data

Jan. 16, 2012    (KR) .................. 10-2012-0004929

(51) Int. Cl.
*F16F 9/19* (2006.01)
*F16F 9/34* (2006.01)

(52) U.S. Cl.
CPC ................ *F16F 9/19* (2013.01); *F16F 9/3405* (2013.01)

(58) Field of Classification Search
CPC .................................. F16F 9/19; F16F 9/3405
USPC .......... 188/313, 322.13, 322.15, 322.22, 275, 188/280, 283, 316; 92/172, 181 P; 91/422
See application file for complete search history.

(56) References Cited

U.S. PATENT DOCUMENTS

| | | | | |
|---|---|---|---|---|
| 4,307,875 A * | 12/1981 | Schnitzius et al. | ............. | 267/120 |
| 5,307,907 A * | 5/1994 | Nakamura et al. | ......... | 188/282.1 |
| 6,102,170 A * | 8/2000 | de Molina et al. | ............. | 188/275 |
| 6,491,145 B2 * | 12/2002 | Adamek et al. | ............. | 188/282.2 |
| 6,702,075 B2 * | 3/2004 | Hartel | ........................ | 188/282.1 |
| 7,954,609 B2 * | 6/2011 | Chikamatsu et al. | ......... | 188/280 |
| 2003/0173168 A1 * | 9/2003 | Gotz et al. | ..................... | 188/289 |
| 2011/0024245 A1 * | 2/2011 | Nezu et al. | ..................... | 188/283 |

FOREIGN PATENT DOCUMENTS

| | | | | |
|---|---|---|---|---|
| DE | 3534298 A1 * | 4/1987 | ............... | 188/322.15 |
| JP | 59086731 A * | 5/1984 | ................... | 188/285 |
| JP | 01065342 A * | 3/1989 | ............... | 188/322.22 |
| JP | 2001-027274 | 1/2001 | | |
| JP | 2010038307 | 2/2010 | | |
| KR | 1989-0011425 | 3/1990 | | |
| KR | 2006-0008105 | 7/2007 | | |
| KR | 1020100097564 | 3/2010 | | |
| KR | 20100074121 | 2/2011 | | |

OTHER PUBLICATIONS

Chen, Y., et al., "Progress in the Surface Moldification Research of Nano-TiO2 Particles," So. China Univ. of Technology, Journal of Ceramics, vol. 23, No. 1, Mar. 2002, pp. 62-66.

* cited by examiner

*Primary Examiner* — Thomas J Williams
*Assistant Examiner* — Mariano Sy
(74) *Attorney, Agent, or Firm* — Lowe Hauptman & Ham, LLP

(57) ABSTRACT

Disclosed herein is a combining structure of a shock absorber including a stopper assembly adapted to surround opposite ends of a bypass passage formed in a piston rod of the shock absorber, with at least one gateway provided to promote smooth flow of a working fluid, and to keep a piston valve firmly pressed against the piston rod and fixed. The combining structure may ensure that the overall length of the shock absorber does not unnecessarily increase, while generating normal damping force without interference with flow of the working fluid.

2 Claims, 2 Drawing Sheets

COMBINING STRUCTURE OF SHOCK ABSORBER

CROSS-REFERENCE TO RELATED APPLICATION(S)

This application claims the benefit of Korean Patent Application No. 2012-0004929, filed on Jan. 16, 2012 in the Korean Intellectual Property Office, the disclosure of which is incorporated herein by reference.

BACKGROUND

1. Field

Embodiments of the present invention relate to a combining structure of a shock absorber which may ensure that the overall length of a shock absorber does not unnecessarily increase and normal damping force is generated without interfering with flow of a working fluid.

2. Description of the Related Art

A shock absorber generally operates according to vibration of a vehicle which depends on road surface conditions and generates damping force, which varies depending on how rapidly the shock absorber is operated.

Since ride comfort and running stability of a vehicle may vary according to the damping force generated by the shock absorber, it may be very important to adjust the characteristics of damping force in designing the vehicle.

Such a shock absorber includes a piston rod installed at a vehicle body, a cylinder installed at an axle and filled with a working fluid. The piston rod is arranged to reciprocate in the cylinder.

In addition, installed at an end of the piston rod is a piston valve, which divides the inner space of the cylinder into a compression chamber and a rebound chamber, and controls flow of the working fluid between the compression chamber and the rebound chamber when the piston rod reciprocates, in order to obtain damping force.

When a bypass passage is additionally installed at the piston rod, any obstruction that may interfere with flow of the working fluid should be removed from opposite ends of the bypass passage.

In general, a conventional shock absorber has a simple structure in which a stopper is installed on an upper side of the opposite ends of the bypass passage with a margin provided between the stopper and the bypass passage, and thereby the diameter of the holes forming the opposite ends of the bypass passage may add length to the shock absorber, increasing the overall length of the shock absorber.

Further, in the conventional shock absorber, when the piston valve is coupled with the piston and fixed by the stopper, a washer is mounted between the stopper and the piston valve. Such a washer may also cause increases of not only the overall length of the shock absorber but also the production costs of the shock absorber.

CITED REFERENCE

Patent Document

Korean Patent Application Nos. 1989-0011425, 2006-0008105 and 2010-0074121

SUMMARY

Therefore, it is an aspect of the present invention to provide a combining structure of a shock absorber which may ensure that the overall length of the shock absorber does not unnecessarily increase, while generating normal damping force without interference with flow of a working fluid.

Additional aspects of the invention will be set forth in part in the description which follows and, in part, will be obvious from the description, or may be learned from practice of the invention.

In accordance with one aspect of the present invention, a combining structure of a shock absorber includes a shock absorber including a cylinder filled with a working fluid, and a piston rod embedded in the cylinder to reciprocate in a longitudinal direction of the cylinder and provided with a connecting passage arranged therein toward an end of the piston rod at which a piston valve is installed, a bypass passage adapted to penetrate the piston rod in a direction perpendicular to a longitudinal direction of the piston rod and connected with an upper end of the connecting passage, and a stopper assembly provided, at an outer side thereof, with at least one gateway penetrating the stopper assembly to communicate with the bypass passage, and coupled with the piston rod to keep the piston valve pressed against the end of the piston rod and fixed, wherein the stopper assembly may include a communicating body contacting, at a lower end thereof, an upper side of the piston valve and provided, at an outer side thereof, with the gateway to communicate with the bypass passage, and a fixture disposed at an upper side of the communicating body to press and fix the communicating body and the piston valve and to keep the upper side of the communicating body sealed, wherein the gateway may be arranged to have a distance to the piston valve which is shorter than or equal to a distance between the bypass passage and the piston valve.

The shock absorber may further include a step portion formed at an outer circumferential surface of a lower portion of the piston rod in a stepped manner, wherein the stopper assembly is coupled to the step portion.

The communicating body may include a washer segment fixed to the step portion formed at the outer circumferential surface of the lower portion of the piston rod in the stepped manner, an inner edge of the washer segment closely contacting an outer circumferential surface of the piston rod, a communicating channel extending upward along an outer edge of the washer segment and formed in a cylindrical shape with the gateway penetrating the communicating channel, and a seat extending along an edge of an upper side of the communicating channel in a stepped manner to allow an edge of a lower end of the fixture to be seated at the seat.

The fixture is a ring-shaped elastic rubber stopper adapted to closely contact the outer circumferential surface of the piston rod and have a slope at an outer edge of a lower end portion of the fixture, the slope being inclined toward the outer circumferential surface of the piston rod, and the seat is adapted to be inclined in a direction facing away from the outer circumferential surface of the piston rod to allow the lower end portion of the fixture to be seated at the seat.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
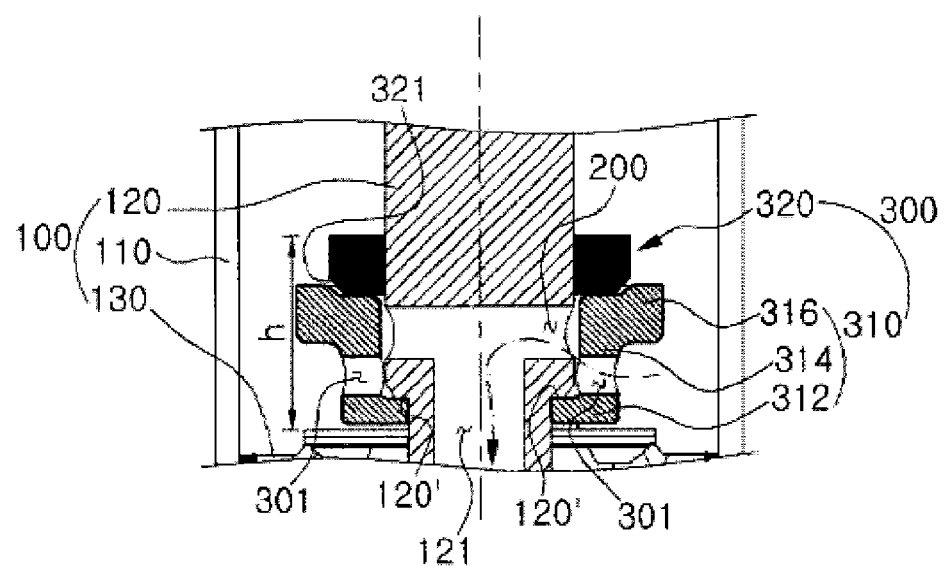
FIG. 1 is a conceptual cross-sectional view illustrating a combining structure of a shock absorber according to an exemplary embodiment of the present invention.

Reference will now be made in detail to the embodiments of the present invention, examples of which are illustrated in the accompanying drawings, wherein like reference numerals refer to like elements throughout.

Figure 2:
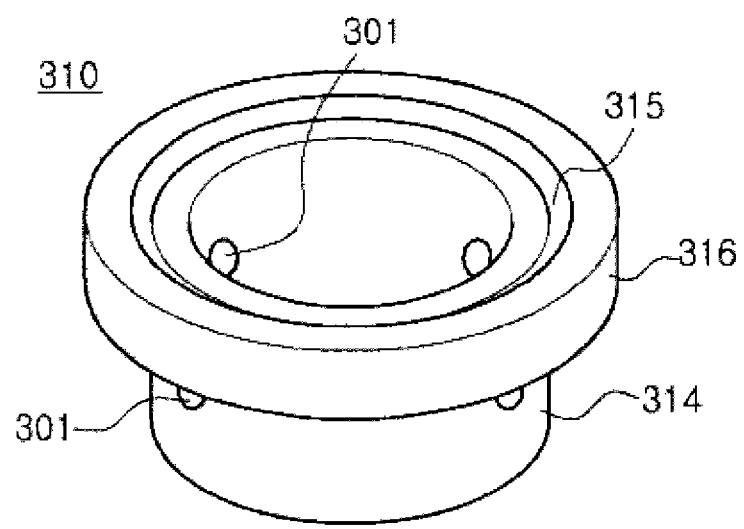
FIG. 2 is a perspective view illustrating a communicating body of a stopper assembly, a main part of the combining structure according to the illustrated embodiment of the present invention.

FIG. 1 is a conceptual cross-sectional view illustrating a combining structure of a shock absorber according to an exemplary embodiment of the present invention, and FIG. 2 is a perspective view illustrating a communicating body of a stopper assembly, a main part of the combining structure according to the illustrated embodiment of the present invention.

As shown in FIGS. 1 and 2, the combining structure according to the illustrated embodiment includes a stopper assembly 300 adapted to surround opposite ends of a bypass passage 200 formed in a piston rod 120 of a shock absorber 100 and provided with at least one gateway 301 to promote smooth flow of a working fluid (oil) and to keep a piston valve 130 firmly pressed against the piston rod 120 and fixed.

The shock absorber 100 includes a cylinder 110 filled with the working fluid, and the piston rod 120 embedded in the cylinder 110 to reciprocate in a longitudinal direction of the cylinder 110 and provided with a connecting passage 121 arranged therein toward an end of the piston rod 120 to which the piston valve 130 is mounted.

The bypass passage 200 is adapted to penetrate the piston rod 120 in a direction perpendicular to the longitudinal direction of the piston rod 120 to be connected with an upper end of the connecting passage 121.

The stopper assembly 300 is provided, at an outer side thereof, with the at least one gateway 301 penetrating the stopper assembly 300 to communicate with the bypass passage 200 and is coupled with the piston rod 120, serving to keep the piston valve 130 pressed against the end of the piston rod 120 and fixed.

Thereby, the gateway 301 may be arranged to have a distance to the piston valve 130 which is shorter than or equal to a distance between the bypass passage 200 and the piston valve 130, in order not to interfere with smooth flow of the working fluid.

In addition to the illustrated embodiment as above, various embodiments such as those described below are also applicable.

The shock absorber 100 may further include a step portion 120' formed at an outer circumferential surface of a lower portion of the piston rod 120 in a stepped manner in order to maintain secure coupling of the step portion 120' with the stopper assembly 300 to firmly fix the piston valve 130 to the piston rod 120.

The stopper assembly 300 may include a communicating body 310 adapted to allow the working fluid to flow therethrough as the working fluid moves in and out of the bypass passage 200, and a fixture 320 to press an upper side of the communicating body 310 to fix the piston valve 130 to the piston rod 120.

The communicating body 310 is provided, at an edge of a washer segment 312, with a communicating channel 314 contacting, at the lower portion thereof, the upper side of the piston valve 130 and having the gateway 301 at an outer side thereof to communicate with the bypass passage 200. And a seat 316 is arranged at an edge of the communicating channel 314.

The washer segment 312 is fixed to the step portion 120' formed at the outer circumferential surface of the lower portion of the piston rod 120 in a stepped manner, with the inner edge of the washer segment 312 closely contacting the outer circumferential surface of the piston rod 120.

The communicating channel 314 is a cylindrical member that extends upward along the outer edge of the washer segment 312 and is provided with the gateway 301 penetrating therethrough.

The seat 316 extends along an edge of an upper side of the communicating channel 314 in a stepped manner to provide an area where an edge 321 of the lower end portion of the fixture 320 is seated.

In addition, the fixture 320 is disposed at an upper side of the communicating body 310, serving to press and fix the communicating body 310 and the piston valve 130 and to keep the upper side of the communicating body 310 sealed.

That is, the fixture 320 is a ring-shaped elastic rubber stopper adapted to closely contact the outer circumferential surface of the piston rod 120 and provided with a slope arranged at the outer edge of the lower end portion of the fixture 320 to be inclined toward the outer circumferential surface of the piston rod 120.

Here, the seat 316 may be provided with a seating step 315 adapted to be inclined along the inner edge of the seat 316 in a direction facing away from the outer circumferential surface of the piston rod 120 to allow the lower end portion of the fixture 320 to be seated at the seat 316.

Thereby, with the combining structure according to the illustrated embodiments, height (h) of the shock absorber may be decreased by about 30 to 40% compared to conventional combining structures of the shock absorber, and therefore it may be possible to reduce the overall length of the shock absorber and realize a compact size of the shock absorber.

As can be seen from the above, it is the basic spirit of the present invention to provide a combining structure of a shock absorber which may ensure that the overall length of the shock absorber does not unnecessarily increase, while generating normal damping force without interference with flow of a working fluid.

As is apparent from the above description, a combining structure of a shock absorber according to embodiments of the present invention may prevent interference with a working fluid through a bypass passage, by surrounding opposite ends of the bypass passage while allowing the working fluid to flow through the gateway of a stopper assembly, in contrast with conventional cases in which a stopper is mounted at the upper side of opposite ends of the bypass passage.

Therefore, compared to conventional cases in which a washer is used or a stopper is mounted at the upper side of opposite ends of the bypass passage, the overall length of the shock absorber may be reduced and thus waste of raw materials may be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A combining structure of a shock absorber, comprising:
a shock absorber including:
  a cylinder filled with a working fluid, and
  a piston rod embedded in the cylinder to reciprocate in a longitudinal direction of the cylinder and provided with a connecting passage arranged therein toward an end of the piston rod at which a piston valve is installed;
a bypass passage
  adapted to penetrate the piston rod in a direction perpendicular to a longitudinal direction of the piston rod, and
  connected with an upper end of the connecting passage; and
a stopper assembly having an outer side, with at least one gateway penetrating the stopper assembly to communicate with the bypass passage, the stopper assembly being coupled with the piston rod to keep the piston valve pressed against the end of the piston rod and fixed,
wherein the stopper assembly includes:
  a communicating body adapted to contact, at a lower end thereof, an upper side of the piston valve and provided, at an outer side thereof, with the at least one gateway to communicate with the bypass passage; and
  a fixture disposed at an upper side of the communicating body to press and fix the communicating body and the piston valve and to keep the upper side of the communicating body sealed,
wherein the at least one gateway is arranged to have a distance to the piston valve which is shorter than or equal to a distance between the bypass passage and the piston valve,
wherein the communicating body comprises:
  a washer segment fixed to a step portion formed at an outer circumferential surface of a lower portion of the piston rod, an inner edge of the washer segment closely contacting the outer circumferential surface of the lower portion of the piston rod;
  a communicating channel extending upward along an outer edge of the washer segment, and formed in a cylindrical shape with the at least one gateway penetrating the communicating channel; and
  a seat extending along an edge of an upper side of the communicating channel and forming a step, to allow an edge of a lower end of the fixture to be seated at the seat.

2. The combining structure according to claim 1, wherein:
the fixture is a ring-shaped elastic rubber stopper adapted to closely contact the outer circumferential surface of the piston rod, and the fixture has a slope at an outer edge of a lower end portion of the fixture, the slope being inclined toward the outer circumferential surface of the piston rod; and
the seat is adapted to be inclined in a direction facing away from the outer circumferential surface of the piston rod to allow the lower end portion of the fixture to be seated at the seat.

* * * * *